United States Patent
Mockenhaupt et al.

(10) Patent No.: US 11,732,802 B2
(45) Date of Patent: Aug. 22, 2023

(54) SEALING GASKET WITH OPTIMIZED PROFILE

(71) Applicant: Dana Automotive Systems Group, LLC, Maumee, OH (US)

(72) Inventors: Martin Mockenhaupt, Buffalo Grove, IL (US); Shaleena Daisy, Naperville, IL (US); Jason M. Tyrus, Tinley Park, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 179 days.

(21) Appl. No.: 17/100,691

(22) Filed: Nov. 20, 2020

(65) Prior Publication Data
US 2022/0163114 A1 May 26, 2022

(51) Int. Cl.
*F16J 15/08* (2006.01)

(52) U.S. Cl.
CPC ................... *F16J 15/0818* (2013.01)

(58) Field of Classification Search
CPC ............ F16J 15/0818; F16J 2015/0868; F16J 2015/085
See application file for complete search history.

(56) References Cited

U.S. PATENT DOCUMENTS

| | | | |
|---|---|---|---|
| 5,924,700 A * | 7/1999 | Kobayashi | F16J 15/0818 277/594 |
| 8,496,253 B2 | 7/2013 | Goettler et al. | |
| 8,757,634 B2 | 6/2014 | Egloff et al. | |
| 9,121,489 B1 * | 9/2015 | Tosa | F16J 15/0887 |
| 11,326,695 B2 * | 5/2022 | Wada | F16J 15/104 |
| 2003/0015845 A1 * | 1/2003 | Miyaoh | F16J 15/0818 277/594 |
| 2003/0230858 A1 * | 12/2003 | Matsuki | F16J 15/0818 277/594 |
| 2004/0113370 A1 * | 6/2004 | Beutter | F16J 15/0818 277/591 |
| 2006/0145428 A1 * | 7/2006 | Dudman | F16J 15/0818 277/626 |
| 2007/0216109 A1 | 9/2007 | Friedow | |

(Continued)

FOREIGN PATENT DOCUMENTS

| | | | | |
|---|---|---|---|---|
| EP | 0893631 A2 | 1/1999 | | |
| JP | 08121596 A * | 5/1996 | ............ | F16J 15/0818 |

(Continued)

*Primary Examiner* — Eugene G Byrd
(74) *Attorney, Agent, or Firm* — McCoy Russell LLP

(57) ABSTRACT

A sealing system for an engine comprising a single layer of sheet material, the sheet having an upper surface adapted to sealably contact a first engine component and a lower surface adapted to sealably contact a second engine component, and bead portions profiled on the gasket, where the gasket profile is optimized with varying heights and widths so as to create portions of varying stiffness adjacent to one another. The bead portions are profiled so as to be concentric with a combustion or cylinder chamber of the engine, and the bead portions include a portion of high stiffness adjacent to a portion of high recovery, the portion of high stiffness having a sharper angle protruding away from the plane comprising the single layer gasket than for the adjacent portion of high recovery. The optimized profile allows use of single layer gaskets to replace multiple layer gaskets.

16 Claims, 5 Drawing Sheets

(56) References Cited

U.S. PATENT DOCUMENTS

| | | | | |
|---|---|---|---|---|
| 2009/0273143 | A1* | 11/2009 | Nagawa | F16J 15/0818 277/608 |
| 2010/0327540 | A1* | 12/2010 | Okano | F16J 15/0825 277/654 |
| 2012/0286480 | A1* | 11/2012 | Efremov | F16L 23/20 277/626 |
| 2015/0069718 | A1* | 3/2015 | Haberer | F16J 15/0818 277/593 |
| 2015/0204270 | A1* | 7/2015 | Davidson | F16J 15/0818 219/121.64 |
| 2017/0074402 | A1* | 3/2017 | Morimoto | F16J 15/0818 |
| 2017/0204973 | A1* | 7/2017 | Claus | F16J 15/064 |
| 2017/0227127 | A1* | 8/2017 | Watanabe | F16J 15/0818 |
| 2018/0023705 | A1* | 1/2018 | Watanabe | F16J 15/0818 277/647 |
| 2018/0328490 | A1* | 11/2018 | Claus | F16J 15/064 |
| 2018/0335142 | A1* | 11/2018 | Watanabe | F16J 15/0818 |
| 2019/0271397 | A1* | 9/2019 | Heuschmid | F16J 15/0881 |

FOREIGN PATENT DOCUMENTS

| | | | | | |
|---|---|---|---|---|---|
| JP | 11230355 | A | * | 8/1999 | F16J 15/0818 |
| JP | 2001032937 | A | * | 2/2001 | F16J 15/0818 |
| JP | 2011089440 | A | * | 5/2011 | F02F 11/00 |
| JP | 2012184832 | A | * | 9/2012 | F16J 15/02 |
| JP | 2013068276 | A | * | 4/2013 | F16J 15/0818 |
| JP | 2013231450 | A | * | 11/2013 | B21D 22/02 |
| JP | 2018135823 | A | * | 8/2018 | F02F 11/002 |

\* cited by examiner

SEALING GASKET WITH OPTIMIZED PROFILE

TECHNICAL FIELD

The present disclosure relates to engine sealing gaskets and, more particularly, sealing gaskets having an optimized profile.

BACKGROUND AND SUMMARY

Engine sealing gaskets, such as cylinder head gaskets, often comprise multiple layers of metallic material with beads formed so as to be concentric with or circumscribe each combustion cylinder chamber or other through hole/ through opening in the gasket. The beads comprise formations intended to maintain sealing, such as between the head and block, for example, during operation of the engine. The gasket generally needs to maintain a seal between the two mating surfaces (between the head and the block) so as to withstand the compressive forces between the mating surfaces and prevent leakage. During operation of the engine, the gasket is subjected to heat, vibration, pressure, and motion, any or all of which may lead to fatigue and cracking of the gasket material, thereby introducing unfavorable leakage paths or at least potential leakage paths and reducing gasket, and thereby engine, performance.

Multi-layer engine gaskets (such as, for example, multi-layer steel (MLS) cylinder-head gaskets) with traditional beads are not as effective in preventing leakage from the cylinder chambers as desired. Motion can cause fatigue failure and cracking of the beads in one or more layer of the gasket, thus causing degraded engine performance and durability. Further, MLS engine gaskets often comprise two to five sheets of spring or carbon steel, which are sandwiched with a sealing material for form the composite multiple layer gasket. Each of the layers are designed to work together (i.e., each layer is designed to interact with adjacent layers) so as to endure the combustions within each cylinder chamber and maintain a seal without breaking or failing due to expansion and contraction of dissimilar materials, exposure to a range of different chemicals, and exposure to extreme temperature variations (including sufficient sealing during cold engine warm up as well as during nominal and above-nominal engine operating temperatures).

An effective gasket and sealing system is needed that prevents leakages and improves engine durability, and that preferably reduces gasket complexity and lowers costs. The present inventors discovered optimized bead profiles which create multiple stage stiffness and higher recovery than previous bead shapes for a given single layer. In various embodiments, a portion of the profile is very stiff, so as to provide improved initial sealing as well as high localized stress for the same given load, which provides improved initial sealing when the joint (e.g., head-to-block) is first assembled; and another portion of the profile provides higher recovery when the joint structure reacts to internal thermal motion (for example, as a cold engine non-uniformly warms up). In various embodiments, a single-layer sealing gasket is described having optimized bead profiles (for optimized performance as a single-layer gasket unencumbered by a need to accommodate other gasket layers) that can create multiple stage stiffness and higher recovery than traditional bead shapes. The bead shapes, according to embodiments described, are made to increase stress locally and also increase total bead recovery, via variable stiffness of the beads by optimizing the widths and heights of the beads/portions of the beads profiled on the gasket. In various embodiments, the beads are formed to include one or more sharper angle than traditionally used, thereby creating an area or areas of high stress/stiffness, and one or more area of softer stiffness (e.g., lower angle) that provides improved/ higher recovery of the gasket. As a result, according to various embodiments described, this produces a dual stiffness (or areas of differential stiffness) to the compression of the bead/beads profiled on the gasket.

In one embodiment, a profile of a single layer (sheet) of a gasket or single-layer engine gasket comprises a portion of high stiffness between portions of high recovery, in a profile referred to as a "vortex" profile. In an aspect, the vortex profile provides a soft bead with high recovery on the outside edges and structure to endure a high load on the inside (of the bead/bead portions profiled on the gasket). In an aspect, the sealing gasket comprises a single layer or sheet of material with the vortex profile, with the upper surface of the layer (and the bead profile protrusions extending upward therefrom) adapted to sealably contact a first engine component (such as the sealing surface of an engine head) and the lower surface of the layer (and the corresponding bead profile protrusions extending downward therefrom) adapted to sealably contact a second engine component (such as the sealing surface of an engine block) when the first and second engine components are sealably and securably compressed with one another to seal the two components together. In an aspect, the portion of high stiffness provides improved sealing between the two components during initial component assembly, and each portion of high recovery provides improved sealing during and after operation of the engine/engine components. In an aspect, the portion of high stiffness comprises a sharper angle (than used with traditional beads) to create a profile portion protruding away from the plane of the layer/sheet, and each portion of high recovery comprises a softer (lower) angle (than the sharper angle used in the portion of high stiffness) to create a profile portion protruding away from the plane of the layer/sheet. In an aspect, the portion of high stiffness comprises a shorter distance (longitudinally along the plane of the layer/sheet and between areas of transition/radius) than for each portion of high recovery (longitudinally along the plane of the layer/sheet and between areas of transition/ radius). In an aspect, the portion of high stiffness provides a greater resistance to compression than each portion of high recovery, and each portion of high recovery provides greater spring characteristics for absorbing motion.

In one embodiment, a profile of a single layer of a gasket or single-layer engine gasket comprises a portion of high recovery between portions of high stiffness, in a profile referred to as an "infinity" profile or profile having the shape of a sideways "S" or partial infinity symbol or partial lemniscate. In an aspect, the infinity profile provides a soft bead with high recovery on the inside (of the beads profiled on the gasket) and structure to endure a high load on the outside edges of the profiled beads. In an aspect, the sealing gasket comprises a single layer or sheet of material with the infinity profile, with the upper surface of the layer (and the bead profile protrusions extending upward therefrom) adapted to sealably contact a first engine component (such as the sealing surface of an engine head) and the lower surface of the layer (and the corresponding bead profile protrusions extending downward therefrom) adapted to sealably contact a second engine component (such as the sealing surface of an engine block) when the first and second engine components are sealably and securably compressed with one another to seal the two components together. In an aspect, each portion of high stiffness provides improved sealing between the two components during initial component assembly, and the portion of high recovery provides improved sealing during and after operation of the engine/ engine components. In an aspect, each portion of high stiffness comprises a sharper angle (than used with traditional beads) to create a profile portion protruding away from the plane of the layer/sheet, and the portion of high recovery comprises a softer (lower) angle (than the sharper angle(s) used in the portions of high stiffness) to create a profile protruding away from the plane of the layer/sheet. In an aspect, each portion of high stiffness comprises a shorter distance (longitudinally along the plane of the layer/sheet and between areas of transition/radius) than for the portion of high recovery (longitudinally along the plane of the layer/sheet and between areas of transition/radius). In an aspect, each portion of high stiffness provides a greater resistance to compression than the portion of high recovery, and the portion of high recovery provides greater spring characteristics for absorbing motion.

In one embodiment, a profile of a single layer of a gasket or single-layer engine gasket comprises a double height (by including two adjacent half beads protruding in the same direction away from the plane of the layer) and forming a full bead (by including, adjacent to the first two half beads, another two half beads directed opposite the first two so as to return to the plane of the layer/sheet) having portions of varying stiffness, in a profile referred to as a "double height stacked" profile. In another embodiment, a profile of a single layer of a gasket or single-layer engine gasket comprises a double height (by including two adjacent half beads protruding in the same direction away from the plane of the layer) and forming a half bead having portions of varying stiffness, in a profile referred to as "double height stairs" profile. In an aspect, each of the double height stacked and double height stairs profiles provide variable stiffness by using half beads of varying shape (such as stiffer using longitudinally narrower/shorter portions and softer using longitudinally wider/longer portions).

In one embodiment, a profile of a single layer of a gasket or single-layer engine gasket comprises a portion of high stiffness adjacent to a portion of high recovery, in a profile referred to as a "prybar" profile or a profile having the shape of a prybar. In an aspect, the prybar profile provides a soft bead with a high recovery portion on one side (of the bead profile) and structure to endure a high load on the other side of the profile, with each portion adjacent to one another. In an aspect, the sealing gasket comprises a single layer or sheet of material with the prybar profile, with the upper surface of the layer (and the bead profile protrusions extending upward therefrom) adapted to sealably contact a first engine component (such as the sealing surface of an engine head) and the lower surface of the layer (and the corresponding bead profile protrusions extending downward therefrom) adapted to sealably contact a second engine component (such as the sealing surface of an engine block) when the first and second engine components are sealably and securably compressed with one another to seal the two components together. In an aspect, the portion of high stiffness provides improved sealing between the two components during initial component assembly, and the portion of high recovery provides improved sealing during and after operation of the engine/engine components. In an aspect, the portion of high stiffness comprises a sharper angle (than used with traditional beads) to create a profile portion protruding away from the plane of the layer/sheet, and the portion of high recovery comprises a softer (lower) angle (than the sharper angle used in the portion of high stiffness) to create a profile portion protruding away from the plane of the layer/sheet. In an aspect, the portion of high stiffness comprises a shorter distance (longitudinally along the plane of the layer/sheet and between areas of transition/radius) than for the portion of high recovery (longitudinally along the plane of the layer/sheet and between areas of transition/ radius). In an aspect, the portion of high stiffness provides a greater resistance to compression than the portion of high recovery, and the portion of high recovery provides greater spring characteristics for absorbing motion than the portion of high stiffness.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Similar reference numerals may have been used in different figures to denote similar components. FIGS. 1-10 and 13 are shown approximately with components and portions in proportional size with one another, according to some embodiments.

DETAILED DESCRIPTION

Figure 1:
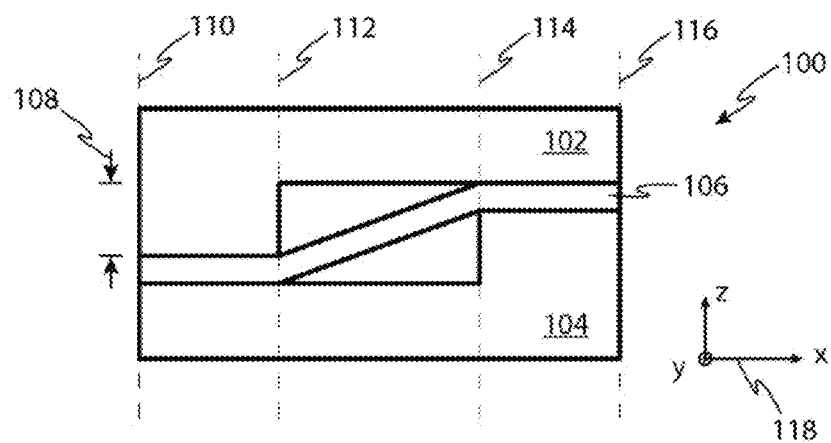
FIG. 1 shows a partial side sectional view or profile of a traditional half bead, along with exemplary (upper and lower) tool halves used to form the traditional half bead, the traditional half bead incorporating proportionate bead width and height characteristics, according to embodiments.

It is to be understood that the disclosure may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 3:
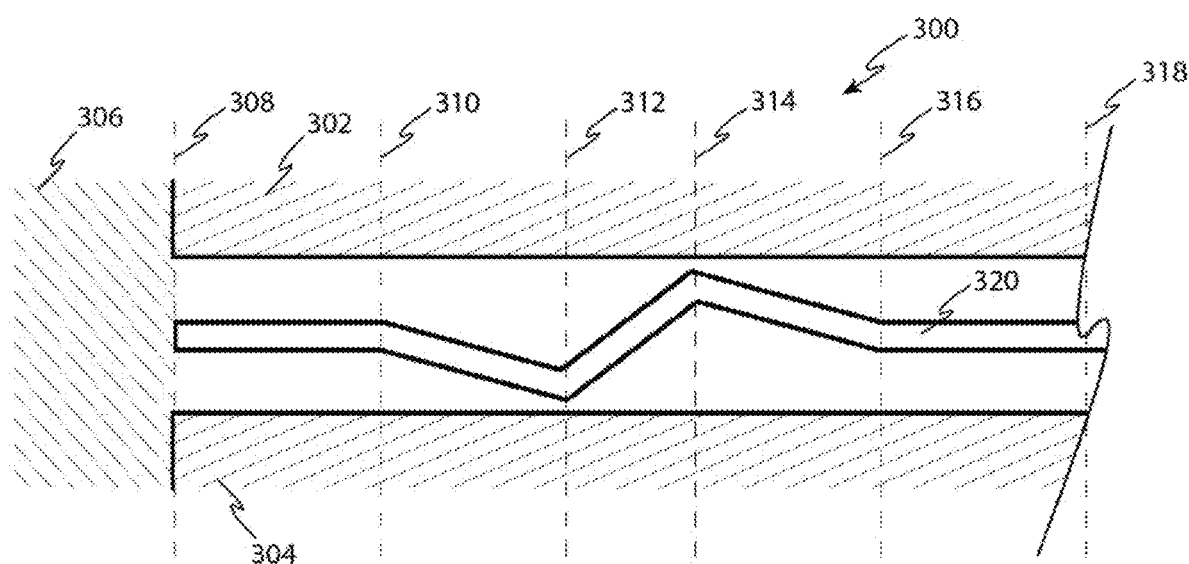
FIG. 3 shows a profile of a single layer of a gasket or single-layer engine gasket having a portion of high stiffness between portions of high recovery, illustrated in context of an engine cylinder chamber, engine cylinder head, and engine block, according to embodiments.

The following description relates to sealing gaskets, in particular, engine sealing gaskets, sealing systems using the sealing gaskets, and optimized bead profiles for such sealing gaskets. As an overview, FIGS. 1, 3, 4, 5, 6, 7, and 13 illustrate optimized beads profiled on a sealing gasket. FIG. 3 illustrates an embodiment of an optimized profile sealing gasket in the context of use as a head gasket to seal an engine head to an engine block and provide sealing about a combustion chamber formed within the head and block. Various figures such as FIGS. 1, 5, 6, 7, 8, and 9 show gasket profiles along with sectional depictions of tooling halves (a post forming/tool halves closed orientation) for stamping/forming the bead or bead structures profiled onto the otherwise flat layer/sheet gasket material. FIGS. 10 and 13 include tool halves in a not-yet-closed/pre-forming orientation with the sheet gasket material positioned therebetween. And FIGS. 11, 12, 14, and 15 illustrate exemplary uncompressed and compressed finite element analysis (FEA) results for the infinity (FIG. 10) and prybar (FIG. 13) bead profiles.

Although the embodiments may be described in detail in the context of an engine sealing gasket or engine sealing system, or more specifically for an internal combustion engine cylinder head sealing gasket and system, various embodiments and/or various aspects of the embodiments described may be separable and may be applied in other engine sealing applications, or other non-engine or non-automotive sealing applications. For example, the various embodiments disclosed and described may be used for sealing between an engine block and cylinder heads to seal combustion gases within the cylinders and to avoid coolant or engine oil from leaking into the cylinders, or for any channel between the head and block, or, more generally, for sealing a first component compressibly and securably fastened to a second component. The bead profiles disclosed herein are described in the context of being concentric with or circumscribing a combustion chamber but may also be used (within the same contiguous gasket) to encircle/circumscribe coolant and/or engine oil through openings. More generally still, the various embodiments disclosed and described may be used for a sealing gasket between a first component and a second component where the first and second components are compressibly and securably fastened together.

FIG. 1 shows a partial side sectional view or profile 100 of a traditional half bead, along with exemplary (upper 102 and lower 104) tool halves 102, 104 used to form the traditional half bead (the half bead comprising the portion of layer 106 shown in the profile 100), the traditional half bead incorporating proportionate bead width (in an x-axis 118 direction or direction longitudinal along the x-y plane) and height (in a z-axis direction or direction lateral to (away from) the x-y plane) characteristics, according to embodiments. As shown, the upper tool half 102 and lower tool half 104 are closed together with the gasket layer 106 therebetween, in a closed tool orientation illustrating the formed (traditional half bead) gasket bead. The tooling halves open and close in the z-axis direction, with the orientation legend indicated having an x-axis 118 along the horizontal (and along the x-y plane), the y-axis extending into/out of the page comprising FIG. 1, and the z-axis being orthogonal (perpendicular) to the x-axis 118 and x-y plane.

In various embodiments, the gasket layer 106 comprises, in an unformed state (prior to being stamped/formed into the profile shown in FIG. 1), a substantially flat sheet of material, with the sheet comprising an x-y plane. When the tool halves 102 and 104 are brought together to form the profile 100 of layer 106, portions of the tooling halves create changes in height and width in the gasket profile. As shown, the layer 106 is held flat (in the x-y plane) between tool halves 102 and 104 within the portion between 110 and 112. A transition at 112 in the upper tool 102 and another transition 114 in the lower tool 104, with each transition having a transition height of 108 (i.e., the upper tool 102 transitioning upward, in one direction away from the x-y plane/plane of the unformed sheet/layer 106, and the lower tool 104 transitioning downward, in a second/opposite direction away from the x-y plane/plane of the unformed sheet/ layer 106). Also as shown, the layer 106 is held between tool halves 102 and 104 within the portion between 114 and 116.

The resulting profile 100 (or formed profile of layer 106 shown in FIG. 1) is a half bead or traditional half bead, with a height 108 and with a transition portion (bead portion) having a width 112-114 extending along the x-axis (or longitudinally across the x-y plane) between the transitions 112 and 114. Such a traditional half bead, as the present inventors observed, provides stiffness (and resistance to deformation) but tends to flatten out when the formed layer is compressed, such as between two components compressibly joined with the traditional half bead layer therebetween.

Figure 2:
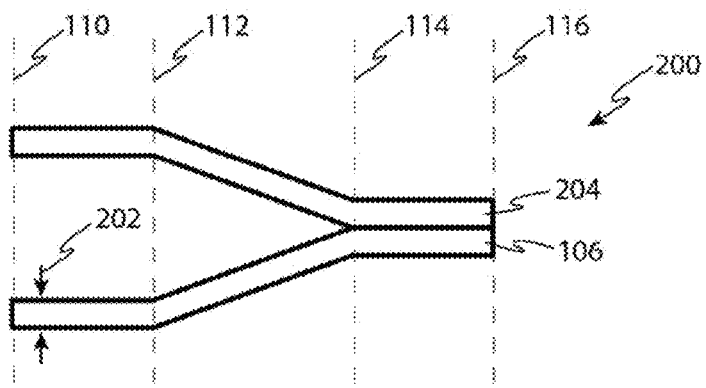
FIG. 2 shows the profile of two of the traditional half bead layers in FIG. 1 arranged for series use in a multiple layer gasket.

A traditional half bead is usually used in combination of two or more layers. For example, FIG. 2 shows the profile 200 of two of the traditional half bead layers in FIG. 1, arranged for series use in a multiple layer gasket. Each of the formed layers 106 and 204 comprise layers having a thickness 202, the thickness measured in the z-axis direction, or orthogonally (perpendicular) to the x-y plane. As shown, the profile of the traditional half bead is limited to the shape shown in FIGS. 1 and 2 to allow beads to work in series (with a profile extending longitudinally across the x-axis).

Next, FIG. 3 shows a sealing system 300 that includes a profile of a gasket or single-layer engine gasket 320 having a portion of high stiffness (comprising the bead portion from transition 312 to transition 314) between portions of high recovery (a first portion of high recovery comprising the bead portion from transition 310 to transition 312, and a second portion of high recovery comprising the bead portion from transition 314 to transition 316), illustrated in context of an engine cylinder chamber 306, engine cylinder head 302, and engine block 304, according to embodiments. The transitions 312 and 314 in the layer/gasket 320 may not be as abrupt as shown in FIG. 2, in some embodiments, however the profile of the gasket 320 shown in FIG. 2 depicts a gasket profile having a narrower width and sharper angle (away from an x-y plane) between 312 and 314 (comprising a bead/bead portion of high stiffness) than between 310 and 312 and between 314 and 316 (each comprising a bead or bead portion of high recovery).

As shown in FIG. 3, according to one embodiment, a profile of a single layer (sheet) of a gasket or single-layer engine gasket 320 comprises a portion of high stiffness (comprising the profile portion from 312 to 314) between portions of high recovery (comprising profile portions from 310 to 312 and from 314 to 316), in a profile referred to as a "vortex" profile. The present inventors discovered that a vortex profile 320 provides what may be referred to as a soft bead with high recovery on the outside edges (e.g., proximate to 310 and 316) and structure to endure a high load on the inside (between the portions of high recovery) of the bead/bead portions profiled on the gasket. In various embodiments, the sealing gasket 320 comprises a single layer or sheet of material with the vortex profile, with the upper surface of the layer (and the bead profile protrusions extending upward therefrom) adapted to sealably contact a first engine component 302 (such as, for example, the sealing surface of an engine head) and the lower surface of the layer (and the corresponding bead profile protrusions extending downward therefrom) adapted to sealably contact a second engine component 304 (such as, for example, the sealing surface of an engine block) when the first and second engine components 302 304 are sealably and securably compressed with one another to seal the two components together.

In various embodiments, when the first component 302 and second component 304 are sealably and securably compressed together, with the single layer sealing gasket (such as, for example, gasket 320) therebetween, the gasket preferably comprises a through hole (through opening) 308 which accommodates an area 306 (such as a combustion chamber) formed with the first and second components 302 and 304 (such as, for example, an engine head and an engine block). The gasket profile preferably extends longitudinally across an x-y plane (between the first and second components 302 and 304) with the profile being concentric with and/or circumscribing the through opening 308 (and, for example, chamber 306). The gasket profile is preferably positioned and oriented so as to provide sealing of the first and second components, with the gasket layer extending radially outward across an x-y plane, potentially beyond 318 radially outward from the beads or bead portions profiled on the gasket encircling the through opening 308.

In the embodiment shown in FIG. 3, the present inventors discovered that the portion of high stiffness (comprising the profile portion between 312 and 314) provides improved sealing between the two components (e.g., head and block) during initial component assembly, and each portion of high recovery (comprising the profile portions between 310 and 312 and 314 and 316) provides improved sealing during and after operation of the (e.g., engine/engine) components. The portion of high stiffness, the present inventors determined, provides a greater resistance to compression than each portion of high recovery, and each portion of high recovery provides greater spring characteristics for absorbing motion.

Figure 4:
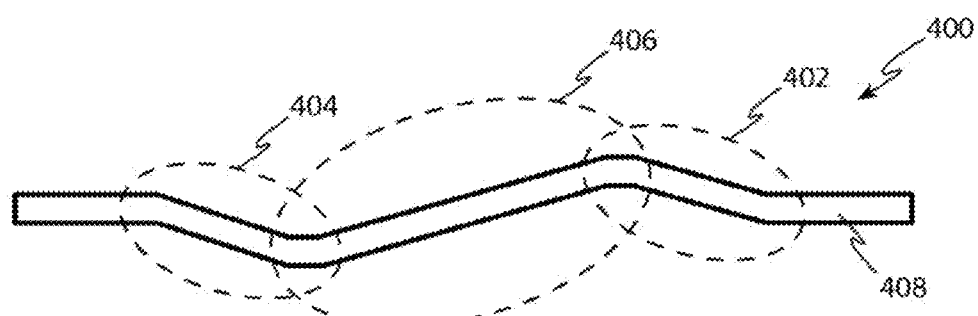
FIG. 4 shows a profile of a single layer of a gasket or single-layer engine gasket having a portion of high recovery between portions of high stiffness, according to embodiments.

FIG. 4 shows a profile 400 of a single layer of a gasket or single-layer engine gasket 408 having a portion of high recovery 406 between portions of high stiffness (404 and 402), according to embodiments. In various embodiments, adjacent portions of varying stiffness or adjacent portions of differential stiffness or adjacent high recovery and high stiffness may overlap with one another. As shown in FIG. 4, the area or bead portion comprising a high recovery portion 406, for example, may include either or both of the transition portions at the outward ends of the profile portion. In the profile shown in FIG. 4, a portion of high stiffness is followed by an adjacent portion of high recovery, which is then followed by an adjacent portion of high stiffness, and the portions overlap one another as to their transition areas, as shown by the dash-line circled 404, 406, and 402.

As shown in FIG. 4, according to one embodiment, a profile 400 of a single layer of a gasket or single-layer engine gasket 408 comprises a portion of high recovery 406 between portions of high stiffness 404 and 402, in a profile referred to as an "infinity" profile or profile having the shape of a sideways "S" or partial infinity symbol or partial lemniscate. The present inventors discovered that an infinity profile provides a soft bead with high recovery 406 on the inside (of the beads profiled on the gasket) and structure (e.g., high stiffness portions 404 and 402) to endure a high load on the outside edges of the profiled beads. The present inventors determined that each portion of high stiffness (e.g., 404 and 402) provides improved sealing between two components (e.g., engine head and engine block) to be sealably fastened during initial component assembly, and the portion of high recovery provides improved sealing during and after operation of the (e.g., engine/engine) assembled components.

For the (infinity) gasket profile illustrated in FIG. 4, each portion of high stiffness 404 and 402 comprises a sharper angle (away from an x-y plane) than used with traditional beads to create a profile portion protruding away from the plane of the layer/sheet, and the portion of high recovery 404 comprises a softer (lower) angle than the sharper angle(s)

used in the portions of high stiffness 404 and 402 to create a profile protruding away from the plane of the layer/sheet. In one embodiment, each portion of high stiffness (404, 402) comprises a shorter (width) distance longitudinally along the plane of the layer/sheet and between areas of transition/radius than for the adjacent portion of high recovery (longitudinally along the plane of the layer/sheet and between areas of transition/radius). The present inventors determined that each portion of high stiffness provides a greater resistance to compression than the portion of high recovery, and that the portion of high recovery provides greater spring characteristics for absorbing motion.

Figure 5:
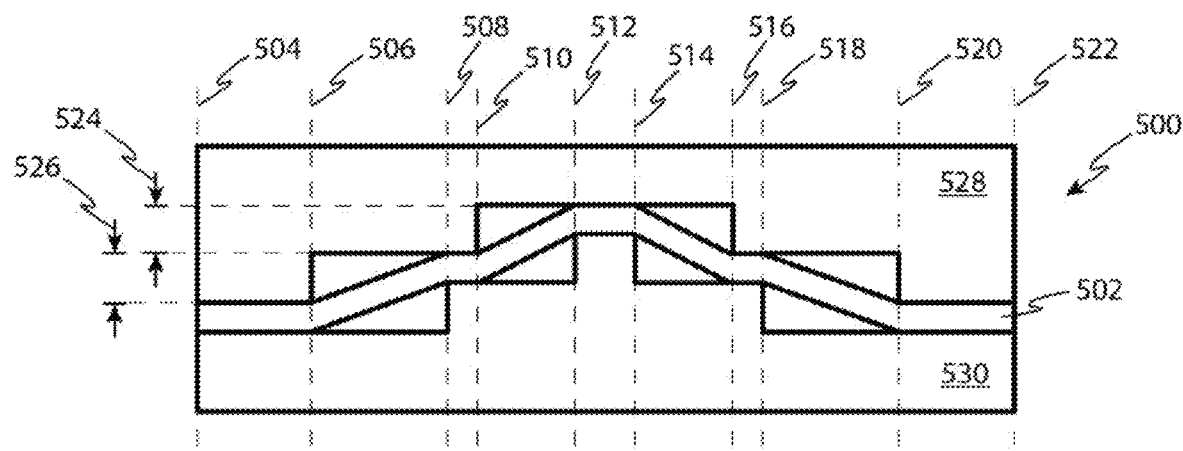
FIG. 5 shows a profile of a single layer of a gasket or single-layer engine gasket having a double height and forming a full bead comprising portions of varying stiffness, along with exemplary tool halves used to form the profile, according to embodiments.
Figure 6:
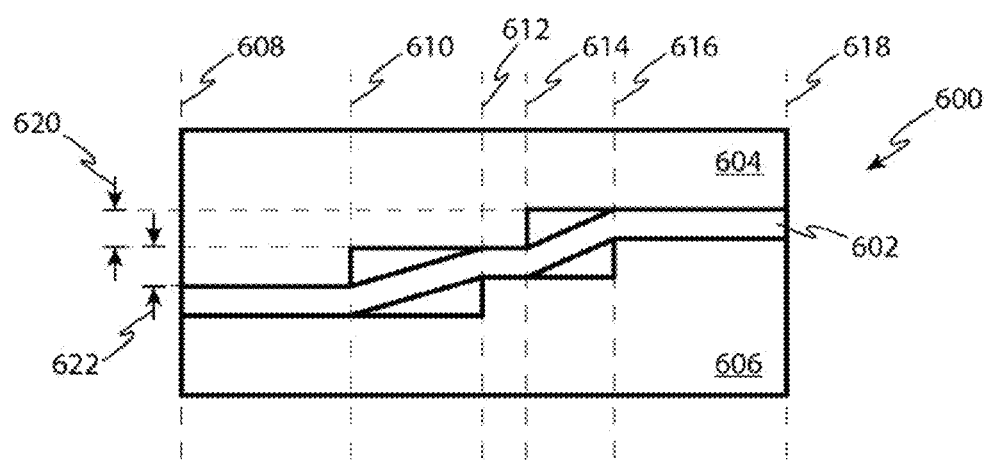
FIG. 6 shows a profile of a single layer of a gasket or single-layer engine gasket having a double height and forming a half bead comprising portions of varying stiffness, along with exemplary tool halves used to form the profile, according to embodiments.

Turning now to FIGS. 5 and 6, double height gasket profiles are illustrated which provide variable stiffness by using half beads of varying shape such as stiffer using longitudinally narrower/shorter portions and softer using longitudinally wider/longer portions. For example, FIG. 5 shows a profile 500 of a single layer of a gasket or single-layer engine gasket 502 having a double height (i.e., bead portions protruding a first height 526 away from the base x-y plane of the gasket sheet, plus additionally protruding a second height 524 away from the base x-y plane) and forming a full bead (with the profile stepping back downward back to the base x-y plane) comprising portions of varying stiffness. FIG. 5 shows the profile 500 along with exemplary tool halves 528 and 530 used to form (and characterize) the profile 500, according to embodiments.

The profile 500 comprises a single layer of a gasket or single-layer engine gasket 502 having a double height (by including two adjacent half beads protruding in the same direction away from the plane of the layer) and forming a full bead (by including, adjacent to the first two half beads, another two half beads directed opposite the first two so as to return to the plane of the layer/sheet), and having portions of varying stiffness, in a profile which may be referred to as a "double height stacked" profile.

Each portion of the tool halves 528 and 530 are preferably sized and configured to form a portion of the bead/bead portion profile so as to create adjacent areas of differential stiffness. For example, the angle (or slope) of the profile portion between (transition point) 506 and (transition point) 508 is preferably different than the angle (or slope) of the (longitudinally adjacent) profile portion between 510 and 512. Changing the rise over run in each adjacent portion provides a different (or differential) slope and resulting stiffness between the adjacent portions. That is, in various embodiments, the height divided by the width of adjacent portions is different such that differing slope (or angles) are present in the gasket profile to create multiple stage stiffness and higher recovery than previously used bead shapes for a given single layer, or for a sealing gasket comprising just a single layer.

As shown in FIG. 5, the tooling halves portions between 504 and 506 and between 520 and 522 are at the same z-axis position relative to one another, thus resulting in a full bead profile, and in this case, a double height stacked full bead profile. The profile portion between 506 and 508 is shown with a width 506-508 and (transitioning the profile to a) height 526; and the profile portion between 510 and 512 is shown with a width 510-512 and (transitioning the profile by an additional) height 524. As shown, the profile slope (angle) within the portion 506-508 is lower than for the profile portion 510-512, and the portion 506-508 provides higher recovery than the adjacent portion 510-512 (which provides higher stiffness than the portion 505-508). The profile portions 514-516 and 518-520 may be, but need not be, mirror images of the profile portions 506-508 and 510-512, respectively.

Next, FIG. 6 shows a profile 600 of a single layer of a gasket or single-layer engine gasket 602 having a double height and forming a half bead comprising portions of varying stiffness, along with exemplary tool halves 604 and 606 used to form the profile, according to embodiments. The profile 600 may be referred to as a "double height stairs" profile. In one embodiment, the double height stairs profile of the single layer gasket 602 is half of the profile of the single layer gasket 502, with, for example, width references 608, 610, 612, 614, 616, and 618 corresponding with width references 504, 506, 508, 510, 512, and 514, respectively; and with height references 622 and 620 corresponding with height references 526 and 524, respectively.

Figure 7:
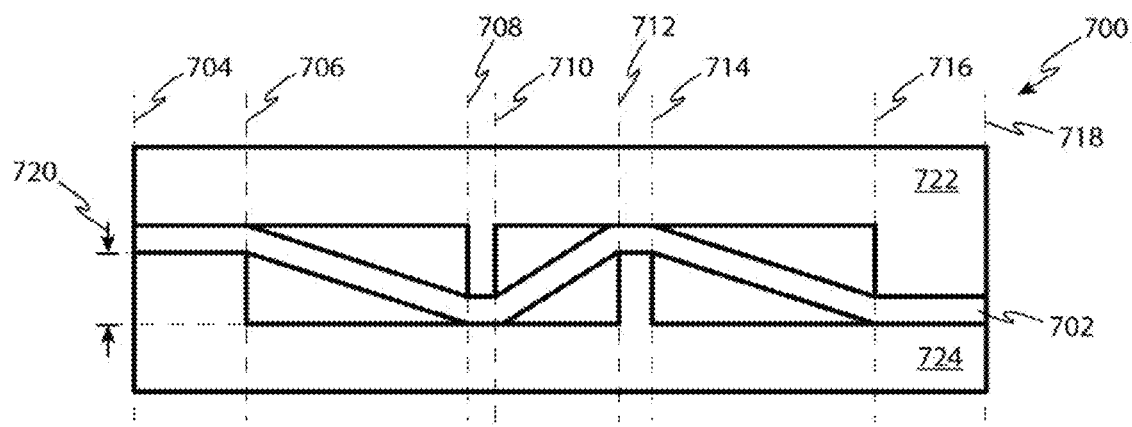
FIG. 7 shows a profile of a single layer of a gasket or single-layer engine gasket having a combined full plus half bead comprising a profile providing dual stiffness via a portion of high stiffness between portions of high recovery, along with exemplary tool halves used to form the profile, according to embodiments.

In another profile configuration, FIG. 7 shows a profile 700 of a single layer of a gasket or single-layer engine gasket 702 having a combined full plus half bead comprising a profile providing dual stiffness via a portion of high stiffness (comprising portion 710-712) between portions of high recovery (comprising portion 706-708 and portion 714-716), along with exemplary tool halves 722 and 724 used to form the profile, according to embodiments. As described with respect to FIG. 5, different portions of the tool halves 722 and 724 are preferably sized and configured to form a portion of the bead/bead portion profile so as to create adjacent areas of differential stiffness. For example, the angle or slope of the profile portion between (transition point) 710 and (transition point) 712 is preferably greater than the (mirror image of the) angle (or slope) of the (longitudinally adjacent) profile portion between 714 and 716, and greater than the (mirror image of the) angle (or slope) of the (longitudinally adjacent) profile portion between 706 and 708. The resulting profile provides a single layer gasket 702 having a portion of high stiffness 710-712 between portions of high recovery 706-708 and 714-716. The profile 700 includes a flat portion 704-706, followed by a protrusion downward by a height 720 (across a high recovery portion 706-708), followed by an adjacent protrusion upward by a height 720 (across a high stiffness portion 710-712 and forming a full bead between 704 and 714), followed by an adjacent protrusion back downward by a height of 720 (across a high recovery portion 714-716 and forming a half bead between 712 and 718 and full plus half (or one and a half) bead between 704 and 718. The angle (slope) in portion 706-708 may be the same as or different than the angle (slope) in portion 714-716.

In various embodiments, each of the portions of high stiffness and high recovery may include areas of transition at the longitudinal (widthwise) ends of such portions. For example, the portion of high stiffness 710-714 may include all or part of the layer within the tool width 708-710 (of the upper tool 722) and all or part of the layer within the tool width 712-714 (of the lower tool 724). Likewise, the portions of high recovery 706-708 and 714-716 may include areas extending from the longitudinal ends of those portions. For example, the portion of high recovery 706-708 may include at least some portion between 704 and 706 at one end, and all or a portion within the tool width 708-710 (of the upper tool 722) at the other end; and the portion of high recovery 714-716 may include all or a portion within the tool width 712-714 (of the lower tool 724) at one end, and at least some portion between 716 and 718 at the other end.

Figure 8:
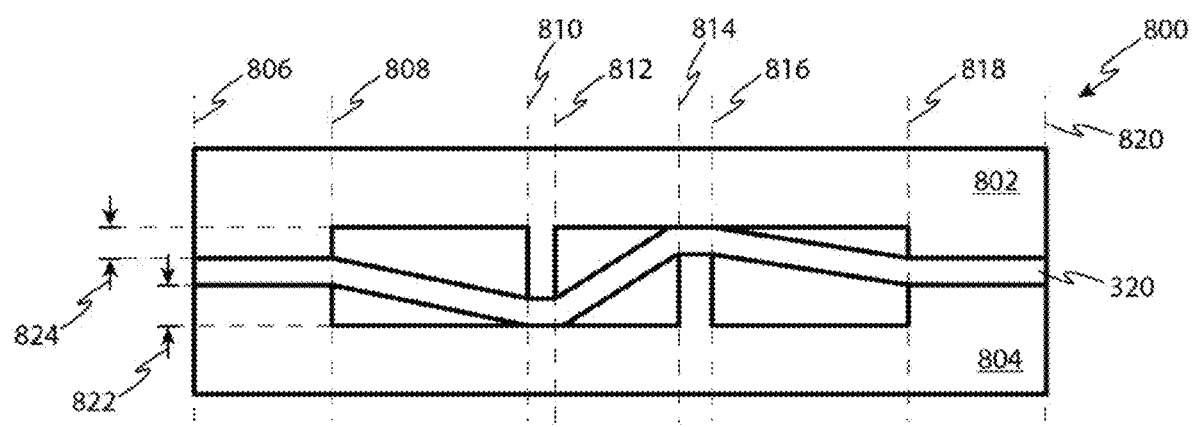
FIG. 8 shows the profile of FIG. 3, along with exemplary tool halves used to form the profile, according to embodiments.
Figure 9:
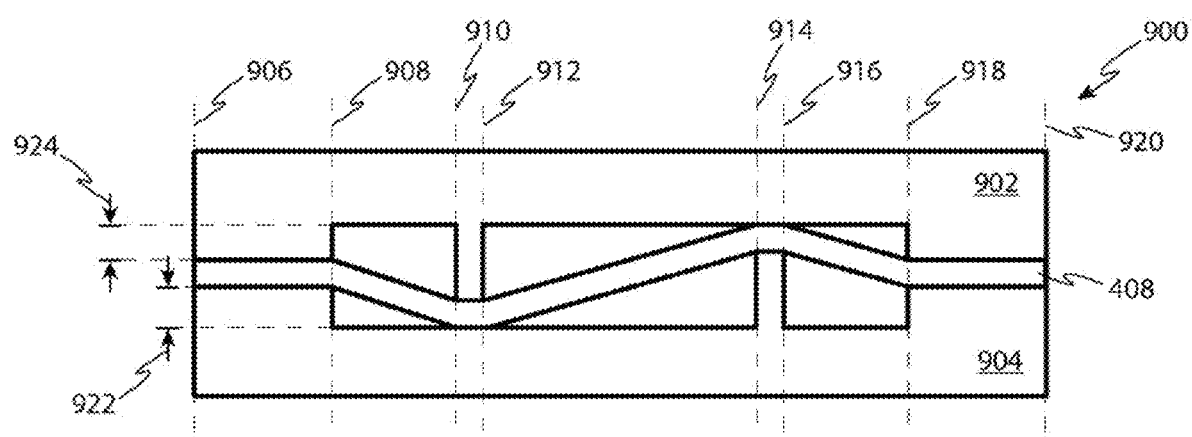
FIG. 9 shows the profile of FIG. 4, along with exemplary tool halves used to form the profile, according to embodiments.
Figure 10:
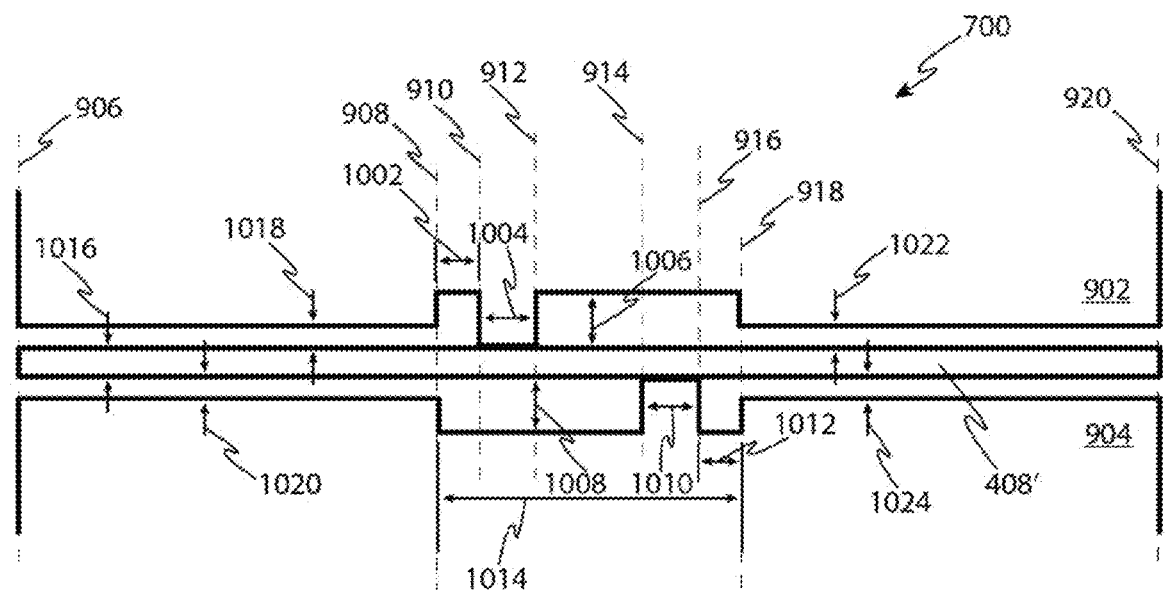
FIG. 10 shows a side sectional view or profile of exemplary (upper and lower) tool halves used to form the profile of FIG. 9 with the tool halves illustrated in a not-yet-closed orientation with a not-yet-formed single layer of gasket material positioned between the tool halves, according to embodiments.

Turning to FIGS. 8 and 9, FIG. 8 shows a configuration 800 for the profile of FIG. 3 with exemplary tool halves 802 and 804 used to form the profile, according to embodiments.

As shown, the bead portions profiled on the gasket 320 include a flat portion 806-808, followed by a portion 808-810 protruding downward by a height of 822 (across a high recovery portion), followed by an adjacent portion 812-814 protruding upward by a height of 822 plus 824 (across a high stiffness portion), followed by an adjacent portion 816-818 protruding back downward by a height of 824 (across a high recovery portion), and followed by a flat portion 818-820 that is coplanar with the flat portion 806-808. As described above with respect to FIG. 7, in various embodiments, each of the portions of high stiffness and high recovery may include areas of transition at the longitudinal (widthwise) ends of such portions.

Further, the tool heights 822 and 824 may be the same or different, and the tool widths 810-812 and 814-816 may be the same or different. As will be discuss further below, the present inventors discovered optimized profiles, in part, via analysis of profile performance for various combinations of tool heights and tool widths, including combinations of profile portion widths and heights to achieve greater or lesser slope angles within a given profile portion for successive adjacent profile portions and overall combinations of the beads or bead portions profiled on the (single layer) gasket.

FIG. 9 shows a configuration 900 for the (infinity or sideways S shaped) profile of FIG. 4, along with exemplary tool halves 902 and 904 used to form the profile, according to embodiments. As shown in FIG. 9, the bead portions profiled on the gasket 408 include a flat portion 906-908, followed by a portion 908-910 protruding downward by a height of 922 (across a high stiffness portion), followed by an adjacent portion 912-914 protruding upward by a height of 922 plus 924 (across a high recovery portion), followed by an adjacent portion 916-918 protruding back downward by a height of 924 (across a high stiffness portion), and followed by a flat portion 918-920 that is coplanar with the flat portion 906-908. As described above with respect to FIGS. 7 and 8, in various embodiments, each of the portions of high stiffness and high recovery may include areas of transition at the longitudinal (widthwise) ends of such portions.

Still referring to FIG. 9 and as discussed with respect to a single layer gasket 408 depicted in FIG. 4, the infinity profile preferably comprises a portion of high recovery between portions of high stiffness, where the angle (slope) of each of the portions of high stiffness is greater than (a traditional half bead and) the angle (slope) of the portion of high recovery. To achieve such relationship (between the middle high recovery portion and the adjacent high stiffness portions on both ends of the profile), the tool heights 922 and 924, tool widths 910-912 and 914-916, and profile portion widths 908-910, 912-914, and 916-918 are preferably chosen so that the portion width 912-914 is greater than the combined width for the portions 908-910 and 916-918 (so as to result in a steeper/sharper angle (slope) in the shorter width end portions 908-910 and 916-918 than the angle (slope) in the middle (high recovery) portion).

An exemplary tooling setup for creating a single layer gasket having a profile as shown in FIGS. 4 and 9 is provided in FIG. 10, which shows a side sectional view or profile 1000 of exemplary (upper and lower) tool halves 902 and 904 used to form the profile of FIG. 9 with the tool halves illustrated in a not-yet-closed orientation with a not-yet-formed single layer of gasket material 408' (408 prime) positioned between the tool halves, according to embodiments. As shown, a flat sheet of gasket material 408' is preferably placed between tooling halves 902 and 904.

The tool halves 902 and 904 comprise (from left to right along an x-axis 118) a first flat (no transition) portion 906-908, followed by a first bead/bead portion width 908-910 (or 1002) ("PW1"), followed by a first tool width 910-912 (or 1004) ("TW1"), followed by a second bead/bead portion width 912-914 ("PW2"), followed by a second tool width 914-916 (or 1010) ("TW2"), followed by a third bead/bead portion width 916-918 (or 1012) ("PW3"), and followed by a second flat (no transition) portion 918-920. The bead/bead portion profile between 908 and 918 comprises the bead or bead portions (to be) profiled on the gasket 408' and has a profile width 1014 ("W").

The upper tool height 1006 ("THU") is shown (in FIG. 10) extending downward (in a z-axis direction) between 910 and 912 (across the first tool width TW1). The lower tool height 1008 ("THL") is shown extending upward (in a z-axis direction) between 914 and 916 (across the second tool width TW2). The gasket sheet/layer 408' is shown positioned between the upper and lower tools 902 and 904, with the upper tool height at a first (left most) end 1018 ("THUE1") (between 906 and 908) and the lower tool height at the first (left most) end 1020 ("THLE1"); and with the upper tool height at a second (right most) end 1022 ("THUE2") (between 918 and 920) and the lower tool height at the second (right most) end 1024 ("THLE2").

In some embodiments, and as shown in FIG. 10 for an infinity profile, THU and THL are the same, and THUE1, THLE1, THUE2, and THLE2 are each one half of THU. In some embodiments, THU may range from 0.35 to 0.5 mm. In some embodiments, THU may be 0.3, 0.35, 0.4, 0.45, or 0.5 mm. In other embodiments, THU, THL, THUE1, THLE1, THUE2, and THLE2 may comprise any of the above values given for THU.

In some embodiments, and as shown in FIG. 10 for an infinity profile, PW2 is greater than PW1 plus PW3. In some embodiments, W is PW1 plus TW1 plus PW2 plus TW2 plus PW3. In some embodiments, W is approximately 2.2 mm. In some embodiments, TW1 and TW2 are the same. In some embodiments, each of TW1 and TW2 may range from 0.45 to 0.5 mm. In some embodiments, each of TW1 and TW2 may be 0.3, 0.35, 0.4, 0.45, or 0.5 mm.

In various embodiments, each of the tooling features extending from each of the upper and lower halves may comprise edges that are more rounded (or radiused) than shown in the figures illustrated herein. For example, the edges comprising the tool height extending downward across the width 1006 (TW1) and the edges comprising the tool height extending upward across the width 1010 (TW2) may include one or more radius, or tool radius.

Figure 11:
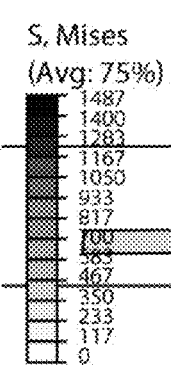
FIG. 11 illustrates Finite Element Analysis (FEA) results showing stresses within a formed bead comprising the profile of FIG. 9, with the gasket uncompressed, according to embodiments.
Figure 11:
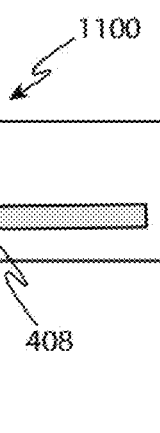
Figure 12:
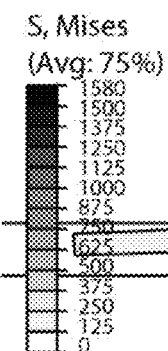
FIG. 12 illustrates FEA results showing stresses within the formed bead of FIG. 11 under a 20 kN load, with the gasket compressed between mating surfaces to be sealed, according to embodiments.
Figure 12:
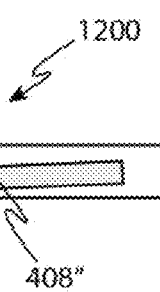
Figure 13:
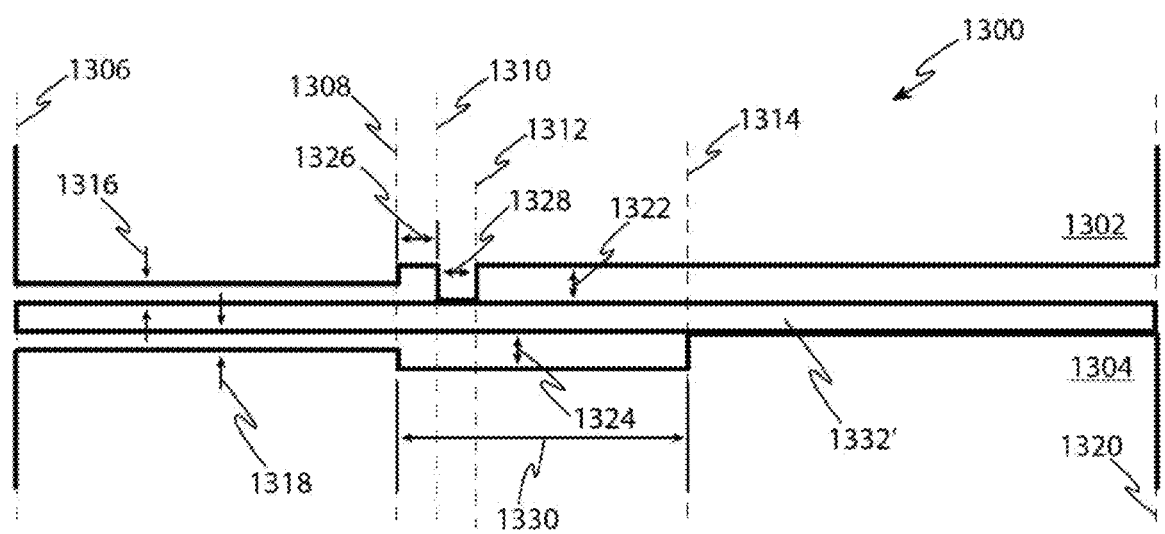
FIG. 13 shows a side sectional view or profile of exemplary (upper and lower) tool halves used to form a profile of a single layer of a gasket or single-layer engine gasket having a portion of high stiffness adjacent to a portion of high recovery, with the tool halves illustrated in a not-yet-closed orientation with a not-yet-formed single layer of gasket material positioned between the tool halves, according to embodiments.

Next, FIGS. 11 and 12 illustrate Finite Element Analysis (FEA) results for a single layer gasket having an infinity bead/bead portions profiled thereon, in uncompressed (FIG. 11) and compressed (FIG. 12) conditions. FIG. 11 illustrates Finite Element Analysis (FEA) results 1100 showing stresses within a formed bead (formed bead/bead profile) comprising the profile of FIG. 9, with the gasket layer 408 uncompressed (i.e., not-yet-compressed in a z-axis direction such as between a first and second component), according to embodiments. FIG. 12 illustrates FEA results 1200 showing stresses within the formed bead of FIG. 11 under a 20 kN load, with the gasket layer 408" (408 double prime) compressed (in the z-axis direction) between mating surfaces (such as surfaces of first and second engine components) to be sealed, according to embodiments.

FIG. 13 shows a side sectional view or profile 1300 of exemplary (upper and lower) tool halves (1302 and 1304, respectively) used to form a profile of a single layer of a gasket or single-layer engine gasket having a portion of high stiffness adjacent to a portion of high recovery, with the tool halves illustrated in a not-yet-closed orientation with a not-yet-formed single layer of gasket material positioned between the tool halves, according to embodiments. The profile may be referred to as a "prybar" profile or a profile having the shape of a prybar. The present inventors discovered that the prybar profile provides a soft bead with a high recovery portion on one side (of the bead profile) and structure to endure a high load on the other side of the profile, with each portion adjacent to one another. According to embodiments, the sealing gasket comprises a single layer or sheet of material with the prybar profile (such as layer 1332 shown in FIG. 14), with the upper surface of the layer (and the bead profile protrusions extending upward therefrom) adapted to sealably contact a first engine component (such as the sealing surface of an engine head) and the lower surface of the layer (and the corresponding bead profile protrusions extending downward therefrom) adapted to sealably contact a second engine component (such as the sealing surface of an engine block) when the first and second engine components are sealably and securably compressed with one another to seal the two components together. The portion of high stiffness (between 1308 and 1310 in FIG. 13, which may include a (transition) portion extending from 1308 toward 1306 on one end and the portion between 1310 and 1312 toward the other end) provides improved sealing between the two components during initial component assembly, and the portion of high recovery (between 1312 and 1314, which may include the portion between 1310 and 1312 and a (transition) portion extending from 1314 toward 1320) provides improved sealing during and after operation of the engine/engine components. In some embodiments, the portion of high stiffness 1308-1310 comprises a sharper angle (than used with traditional beads) to create a profile portion protruding away from the plane of the layer/sheet 1332 in a first z-axis direction, and the portion of high recovery comprises a softer (lower) angle (than the sharper angle used in the portion of high stiffness) to create a profile portion extending the other way back to the plane of the layer/sheet 1332 and protruding upward in a second z-axis direction opposite the first. Preferably, the portion of high stiffness 1308-1310 comprises a shorter distance 1326 (longitudinally along the plane of the layer/sheet and between areas of transition/radius) than for the portion of high recovery 1312-1314 (longitudinally along the plane of the layer/sheet and between areas of transition/radius). The present inventors determined that the portion of high stiffness 1308-1310 provides a greater resistance to compression than the portion of high recovery 1312-1314, and the portion of high recovery 1312-1314 provides greater spring characteristics for absorbing motion than the portion of high stiffness 1308-1310.

In the exemplary tooling setup shown in FIG. 13, the tool halves 1302 and 1304 are illustrated in a not-yet-closed orientation with a not-yet-formed single layer of gasket material 1332' (1332 prime) positioned between the tool halves, according to embodiments. As shown, a flat sheet of gasket material 1332' is preferably placed between tooling halves 1302 and 1304. The tool halves 1302 and 1304 comprise (from left to right along an x-axis 118) a first flat (no transition) portion 1306-1308, followed by a first bead/bead portion width 1308-1310 (or 1326) ("PW1"), followed by a first tool width 1310-1312 (or 1328) ("TW1"), followed by a second bead/bead portion width 1312-1314 ("PW2"), and followed by a second flat (no transition) portion 1314-1320. The bead/bead portion profile between 1308 and 1314 comprises the bead or bead portions (to be) profiled on the gasket 1332' and has a profile width 1330 ("W").

The upper tool height 1322 ("THU") is shown (in FIG. 13) extending downward (in a z-axis direction) between 1310 and 1312 (across the first tool width TW1). The gasket sheet/layer 1332' is shown positioned between the upper and lower tools 1302 and 1304, with the upper tool height at a first (left most) end 1316 ("THUE1") (between 1306 and 1308) and the lower tool height at the first (left most) end 1318 ("THLE1"); and the lower tool height at the second (right most) end "THLE2" between 1314 and 1320.

In some embodiments, for a prybar profile, THUE1 and THLE1 are each one half of THU, and THLE2 is the same as THU. In some embodiments, THU may range from 0.35 to 0.5 mm. In some embodiments, THU may be 0.3, 0.35, 0.4, 0.45, or 0.5 mm. In other embodiments, THU, THUE1, and THLE2 may comprise any of the above values given for THU.

In some embodiments, and as shown in FIG. 10 for a prybar profile, PW2 is greater than PW1. In some embodiments, W is PW1 plus TW1 plus PW2. In some embodiments, W is approximately 2.2 mm. In some embodiments, TW1 may range from 0.45 to 0.5 mm. In some embodiments, TW1 may be 0.3, 0.35, 0.4, 0.45, or 0.5 mm.

In various embodiments, each of the tooling features extending from each of the upper and lower halves may comprise edges that are more rounded (or radiused) than shown in the figures illustrated herein. For example, the edges comprising the tool height extending downward across the width 1328 (TW1) and the edges comprising the lower tool height transitions at 1308 and 1314 may include one or more radius, or tool radius.

Figure 14:
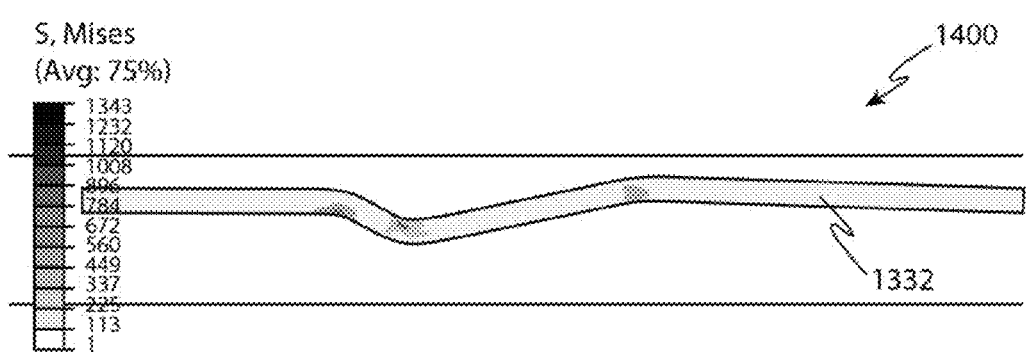
FIG. 14 illustrates FEA resulting showing stresses within a formed bead comprising the profile of FIG. 13, with the gasket uncompressed, according to embodiments.
Figure 15:
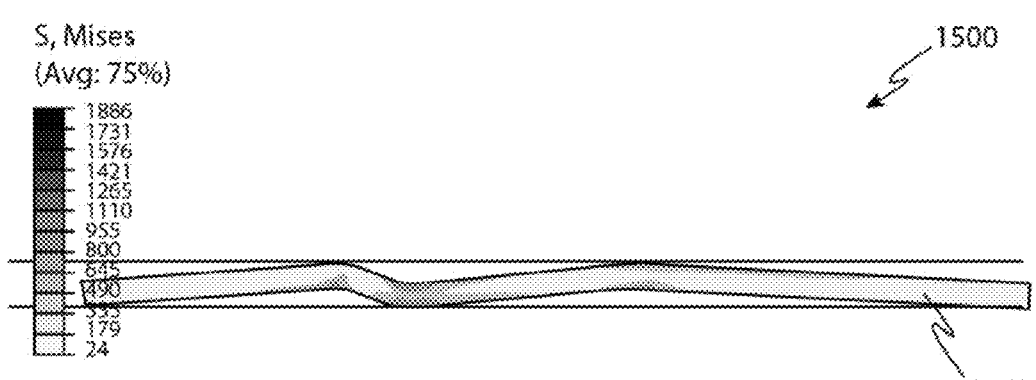
FIG. 15 illustrates FEA resulting showing stresses within the formed bead of FIG. 14 under a 20 kN load, with the gasket compressed between mating surfaces to be sealed, according to embodiments.

Next, FIGS. 14 and 15 illustrate Finite Element Analysis (FEA) results for a single layer gasket having a prybar bead/bead portions profiled thereon, in uncompressed (FIG. 14) and compressed (FIG. 14) conditions. FIG. 14 illustrates Finite Element Analysis (FEA) results 1400 showing stresses within a formed bead (formed bead/bead profile) comprising the profile formed using a tooling setup as shown in FIG. 13, with the gasket layer 1332 uncompressed (i.e., not-yet-compressed in a z-axis direction such as between a first and second component), according to embodiments. FIG. 15 illustrates FEA results 1500 showing stresses within the formed bead of FIG. 14 under a 20 kN load, with the gasket layer 1332" (1332 double prime) compressed (in the z-axis direction) between mating surfaces (such as surfaces of first and second engine components) to be sealed, according to embodiments.

The present inventors determined that optimizing the beads profiled on a single layer gasket as described herein, allows use of single layer gaskets to replace multiple layer gaskets. The technical effect of such single layer gaskets, results in improved value to customers due to lower costs of designing, for example, an engine, sealing system, reduced required bolt loads/bolt landing areas for sealing components, simplified (less complex) gasket designs (i.e., single layer as compared with multiple layer gaskets), lower costs to manufacture the gaskets, and improved sealing performance for single layer gaskets so as to allow using a single layer system otherwise requiring multi-layer gasket sealing solutions, among other benefits.

FIGS. 1, 3, 5-10, and 13 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Certain adaptations and modifications of the described embodiments can be made. Therefore, the above discussed embodiments are considered to be illustrative and not restrictive. The present disclosure is not to be limited in scope by the specific embodiments described herein. Further example embodiments may also include all of the steps, features, compositions and compounds referred to or indicated in this description, individually or collectively and any and all combinations or any two or more of the steps or features.

Throughout this document, the use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more. The words "comprising" (and any form of comprising, such as "comprise' and comprises), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "forward", "backward", "back", "rear", "upwardly", "downwardly", etc. is used. It is to be understood that such terminology is used for ease of description and in a relative sense only and is not to be taken in any way as specifying an absolute direction or orientation.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' are used. This language seeks to incorporate at least 10% variability to the specified number or range. That variability may be plus 10% or negative 10% of the particular number specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A sealing system for an engine, the sealing system comprising:
   a single layer gasket, the single layer gasket being formed from a substantially planar flat sheet of material, wherein the substantially planar flat sheet of material comprises an x-y plane; and
   a plurality of beads or bead portions profiled on the gasket, where the beads or bead portions are formed with varying heights and widths so as to create portions of varying stiffness, the heights of the beads or bead portions extending in z-axis directions away from the x-y plane, and the widths of the beads or bead portions extending in a direction longitudinal along the x-y plane, wherein the portions of varying stiffness are adjacent to one another, wherein the plurality of beads or bead portions profiled on the gasket include a portion of high stiffness adjacent to a portion of high recovery, the portion of high stiffness having a first bead profile protruding away from the x-y plane at a first angle to a first height away from the x-y plane and extending a first width along the x-y plane, the portion of high recovery having a second bead profile protruding away from the x-y plane at a second angle to a second height away from the x-y plane and extending a second width along the x-y plane, wherein the first angle in relation to the x-y plane is greater than the second angle in relation to the x-y plane, and the first width is less than the second width, and wherein the plurality of beads or bead portions profiled on the gasket includes material that extends in the direction longitudinal along the x-y plane, transitions in a first z-axis direction to a first region below the x-y plane, and then transitions in a second z-axis direction so that the material extends in the second z-axis direction from the first region below the x-y plane directly to a second region above the x-y plane, where the first region and second region are on opposite sides of the x-y plane.

2. The sealing system of claim 1, wherein the single layer gasket comprises a sheet of gasket material, the sheet having an upper surface adapted to sealably contact a first engine component and a lower surface adapted to sealably contact a second engine component.

3. The sealing system of claim 1, wherein the plurality of beads or bead portions are profiled on the gasket so as to be concentric with or circumscribe a through hole in the gasket sized and arranged for a cylinder chamber of the engine.

4. The sealing system of claim 1, wherein the portion of high stiffness provides a greater resistance to compression than the portion of high recovery, and the portion of high recovery provides a spring characteristic for absorbing motion.

5. The sealing system of claim 1, wherein the plurality of beads or bead portions comprise the portion of high recovery between portions of high stiffness.

6. The sealing system of claim 5, wherein the portions of high stiffness each provide a greater resistance to compression than the portion of high recovery, and the portion of high recovery provides a spring characteristic for absorbing motion.

7. The sealing system of claim 1, wherein the plurality of beads or bead portions comprise the portion of high stiffness between portions of high recovery.

8. The sealing system of claim 7, wherein the portion of high stiffness provides a greater resistance to compression than each of the portions of high recovery, and each portion of high recovery provides a spring characteristic for absorbing motion.

9. A single layer engine gasket, the gasket comprising:
a single layer of sheet material, the sheet comprising an x-y plane and having an upper surface adapted to sealably contact a first engine component and a lower surface adapted to sealably contact a second engine component; and
a plurality of beads or bead portions profiled on the gasket, where the beads or bead portions are formed with varying heights and widths so as to create portions of varying stiffness, the heights of the beads or bead portions extending in z-axis directions away from the x-y plane, and the widths of the beads or bead portions extending in a direction longitudinal along the x-y plane, wherein the portions of varying stiffness are adjacent to one another, wherein the plurality of beads or bead portions are profiled on the gasket so as to be concentric with or circumscribe at least one through opening in the gasket, each through opening sized and arranged for a combustion or cylinder chamber of the engine, wherein the plurality of beads or bead portions comprise a portion of high stiffness adjacent to a portion of high recovery, the portion of high stiffness having a first bead profile protruding away from the x-y plane at a first angle to a first height away from the x-y plane and extending a first width along the x-y plane, the portion of high recovery having a second bead profile protruding away from the x-y plane at a second angle to a second height away from the x-y plane and extending a second width along the x-y plane, wherein the first angle in relation to the x-y plane is greater than the second angle in relation to the x-y plane, and the first width is less than the second width, wherein the plurality of beads or bead portions profiled on the gasket includes material that extends in the direction longitudinal along the x-y plane, transitions in a first z-axis direction to a first region below the x-y plane, and then transitions in a second z-axis direction so that the material extends in the second z-axis direction from the first region below the x-y plane directly to a second region above the x-y plane, where the first region and second region are on opposite sides of the x-y plane, and wherein the plurality of beads or bead portions profiled on the gasket at least partially deform as the first component is compressibly and securably fastened to the second component with the single layer gasket positioned therebetween.

10. The gasket of claim 9, wherein the heights and widths of the beads or bead portions are determined using finite element analysis.

11. The gasket of claim 9, wherein the heights include at least one protrusion extending outward away from the upper surface of the sheet and at least one protrusion extending outward away from the lower surface of the sheet.

12. The gasket of claim 9, wherein a profile of the gasket comprises a first protrusion extending outward away from the lower surface of the sheet followed by a second protrusion adjacent to the first protrusion and extending outward away from the upper surface of the sheet, with the first protrusion comprising the portion of high stiffness, and the second protrusion comprising the portion of high recovery.

13. The gasket of claim 9, wherein a profile of the gasket comprising the beads or bead portions has the shape of a sideways S or partial infinity symbol or partial lemniscate.

14. The gasket of claim 9, wherein a profile of the gasket comprising the beads or bead portions has the shape of a prybar.

15. The sealing system of claim 5, wherein a profile of the gasket comprising the beads or bead portions has the shape of a sideways S or partial infinity symbol or partial lemniscate.

16. The sealing system of claim 1, wherein a profile of the gasket comprising the beads or bead portions has the shape of a prybar.

* * * * *